United States Patent
Ouchi

(10) Patent No.: US 7,744,463 B2
(45) Date of Patent: Jun. 29, 2010

(54) IMAGE GENERATION SYSTEM, PROGRAM AND INFORMATION STORAGE MEDIUM

(75) Inventor: Satoru Ouchi, Yokohama (JP)

(73) Assignee: Namco Bandai Games, Inc., Tokyo (JP)

(*) Notice: Subject to any disclaimer, the term of this patent is extended or adjusted under 35 U.S.C. 154(b) by 1241 days.

(21) Appl. No.: 10/934,372

(22) Filed: Sep. 7, 2004

(65) Prior Publication Data

US 2005/0096131 A1 May 5, 2005

Related U.S. Application Data

(63) Continuation of application No. PCT/JP03/15393, filed on Dec. 2, 2003.

(30) Foreign Application Priority Data

Dec. 4, 2002 (JP) ............................. 2002-352092

(51) Int. Cl.
*A63F 13/00* (2006.01)

(52) U.S. Cl. .................... 463/31; 463/3; 463/6; 463/8; 463/34; 273/108.1; 273/317.1; 348/121; 345/625; 345/636; 434/38; 434/44; 434/69

(58) Field of Classification Search ......... 345/472–474, 345/1.1–1.3, 2.1–2.3, 3.1–3.4, 24, 419, 467–469, 345/539, 543–544, 625, 636, 638, 653–656, 345/664–666, 682–683, 686, 949–950, FOR. 139, 345/FOR. 153; 463/1–5, 7–8, 30–39, 40–43, 463/49–57, 6; 273/108.1, 127 R, 148 R, 273/148 B, 309, 317.1, 340, 348, 361–367; 348/14.15, 39, 42, 47–52, 121, 136–137, 348/211.14, 576, 588–589, 719, 721, E13.004, 348/E13.064–E13.067; 375/240.15–240.16, 375/240.25; 434/38, 43–44, 69, 118, 256–257
See application file for complete search history.

(56) References Cited

U.S. PATENT DOCUMENTS 5,880,709 A * 3/1999 Itai et al. .................... 345/629

(Continued)

FOREIGN PATENT DOCUMENTS

JP A 6-277361 10/1994

(Continued)

OTHER PUBLICATIONS http://www.mobygames.com/search/quick?game=devil+may+cry&p=-1; released: 2001; Publisher: CAPCOM; Edition:1.*
Devil May Cry, Oct. 17, 2001, see in full.*

(Continued)

*Primary Examiner*—Peter DungBa Vo
*Assistant Examiner*—Arthur O. Hall
(74) *Attorney, Agent, or Firm*—Oliff & Berridge, PLC

(57) ABSTRACT

A parameter of a consumption item (fuel, life) consumed as a game progresses is calculated. When a setting of a game termination condition changes, a rate of change of the parameter of the consumption item is changed according to the change of the setting. The game termination condition is a condition relating to the number of laps on a course, a time limit of a game or a game quota. The rate of change of the parameter of the consumption item is increased as the number of laps on a course is reduced, as the time limit of a game is shortened, or as the game quota is reduced. When a value of the parameter of the consumption item becomes equal to zero as a game progresses, the movement or motion of an object is disabled. The parameter of the consumption item is changed from an initial value set by a player with the rate of change which has been specified based on the game termination condition set by the player.

10 Claims, 13 Drawing Sheets

U.S. PATENT DOCUMENTS

| | | | |
|---|---|---|---|
| 5,910,046 A * | 6/1999 | Wada et al. | 463/6 |
| 5,971,855 A * | 10/1999 | Ng | 463/42 |
| 6,168,519 B1 * | 1/2001 | Nakagawa et al. | 463/4 |
| 6,171,186 B1 * | 1/2001 | Kurosawa et al. | 463/31 |
| 6,375,571 B1 * | 4/2002 | Ohnuma et al. | 463/37 |
| 6,425,827 B1 * | 7/2002 | Nimura | 463/35 |
| 6,533,663 B1 * | 3/2003 | Iwao et al. | 463/32 |
| 6,579,173 B1 * | 6/2003 | Okuda | 463/6 |
| 6,604,008 B2 * | 8/2003 | Chudley et al. | 700/92 |
| 6,688,985 B2 * | 2/2004 | Weiss et al. | 463/58 |
| 6,695,694 B2 * | 2/2004 | Ishikawa et al. | 463/7 |
| 6,758,752 B1 * | 7/2004 | Miyagawa | 463/31 |
| 7,059,963 B2 * | 6/2006 | Okamura et al. | 463/3 |
| 2002/0090995 A1 * | 7/2002 | Haga et al. | 463/31 |

FOREIGN PATENT DOCUMENTS

| | | |
|---|---|---|
| JP | A 8-329273 | 12/1996 |
| JP | A 2000-126451 | 5/2000 |
| JP | A 2001-142617 | 5/2001 |

OTHER PUBLICATIONS

NBA Live 2003, Oct. 8, 2002, see in full.*
Wave Race, Jul. 1, 1992, see in full.*
Play Station Perfect Conquest Series 84, Dome's Ambition 2, The Race of Champions, Formal Guidebook, pp. 30, 64-65, 82 and 87 (w/ English Translation). 1998.

* cited by examiner

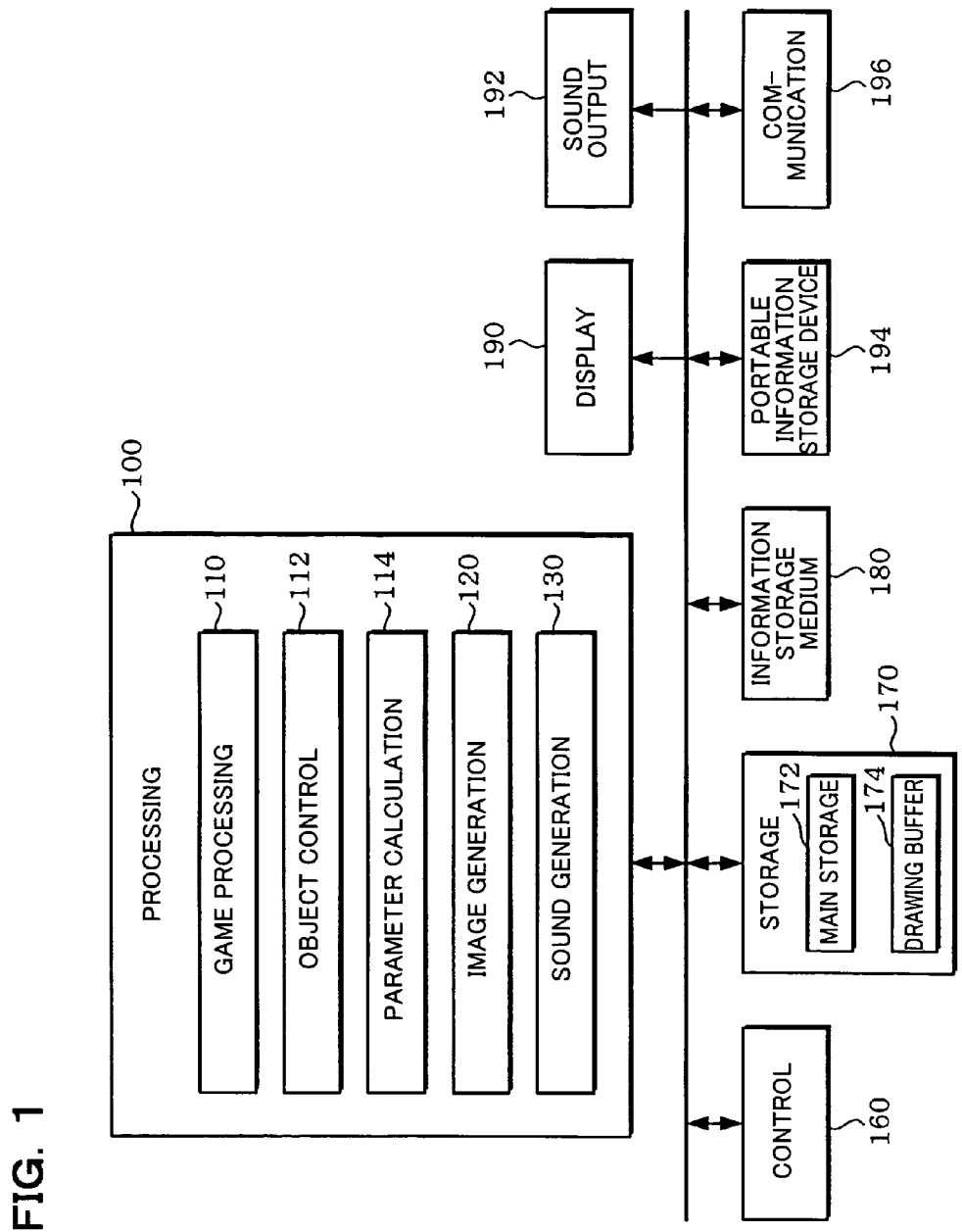

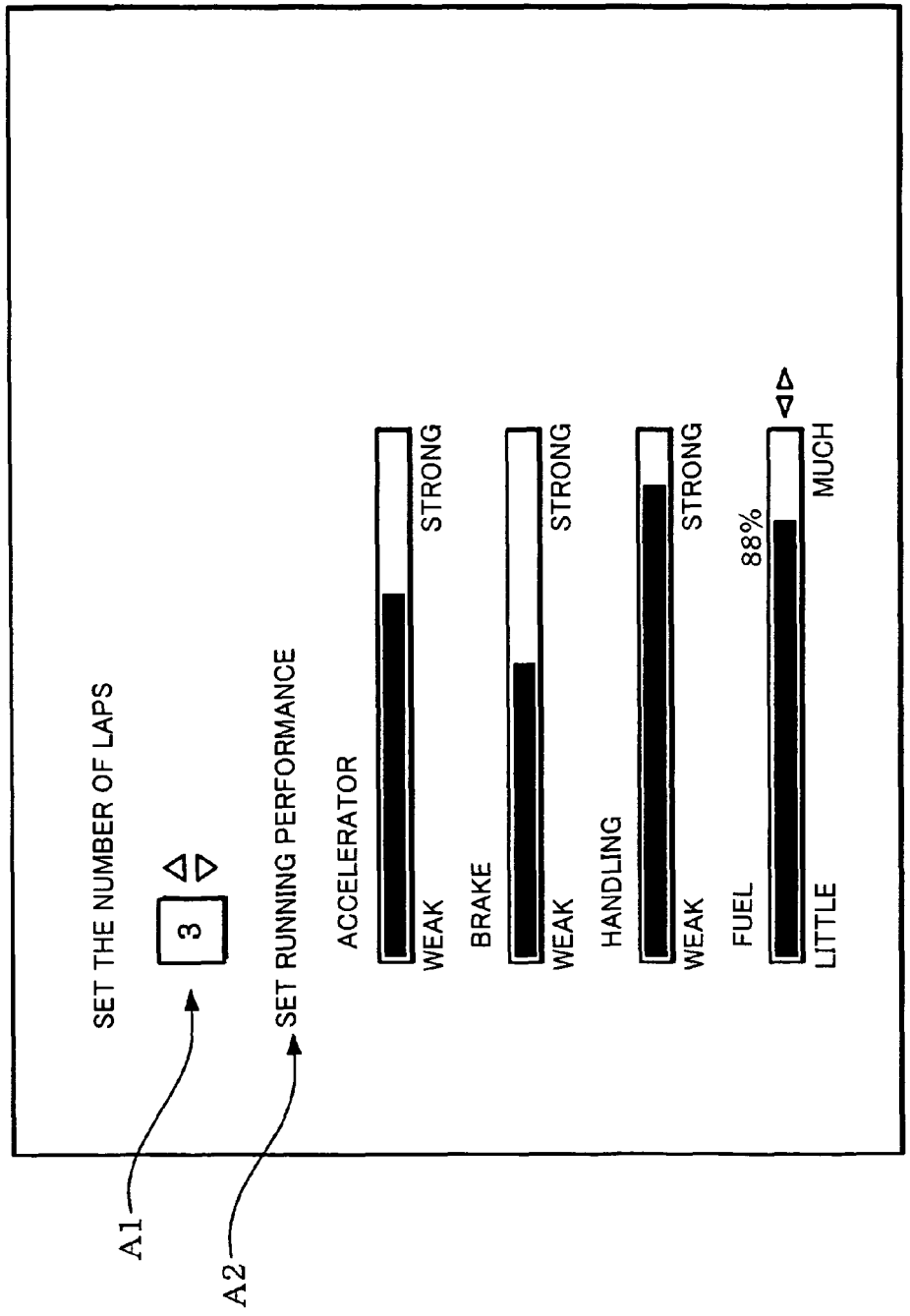

NUMBER OF LAPS = 5

NUMBER OF LAPS = 2

IMAGE GENERATION SYSTEM, PROGRAM AND INFORMATION STORAGE MEDIUM

CROSS REFERENCE TO RELATED APPLICATION

This application is a continuation of International Patent Application No. PCT/JP2003/15393, having an international filing date of Dec. 2, 2003, which designated the United States, the entirety of which is incorporated herein by reference. Japanese Patent Application No. 2002-352092 filed on Dec. 4, 2002 is also incorporated herein by reference in its entirety.

BACKGROUND OF THE INVENTION

The present invention relates to an image generation system, program and information storage medium.

Conventionally, an image generation system (or game system) for generating an image as viewed from a given viewpoint (or virtual camera) in an object space which is a virtual three-dimensional space is known. It is highly popular as a system by which a so-called virtual reality can be experienced. For example, in an image generation system in which a player can enjoy a competition game (or car game), the player enjoys the game by using a control section (a steering wheel, a shift lever, an accelerator pedal, a brake pedal and the like) to control a moving object (player's moving object or player's car) and to compete with another moving object (another player's moving object or another car) which are controlled by another player (a computer player or another human player). It is desirable that in such an image generation system consumption of consumption supplies such as tires or the like is also simulated so as to improve the reality of the game.

However, for example, if there is a change in the setting of game termination condition (or game clear condition) such as the number of laps on a course, it has been found that an unnatural situation which would not be accepted by a player will be created when the consumption is to be simulated as faithful to events of the actual world.

BRIEF SUMMARY OF THE INVENTION

The present invention was invented in view of the aforementioned problem and the present invention may provide an image generation system, program and information storage medium which can realize a consumption simulation with less unnaturalness.

According to one aspect of the present invention, there is provided an image generation system which generates an image comprising:
a memory which stores a program and data for generating an image; and
at least one processor which is connected to the memory and performs a processing for generating an image,
wherein the processor comprises:
a game processing section which performs a game processing based on operation data from a control section, and performs a processing to terminate a game when a game termination condition is satisfied;
a parameter calculation section which calculates a parameter of a consumption item which is consumed as a game progresses; and
an image generation section which generates a game image based on a result of the game processing,
wherein, when a setting of the game termination condition changes, the parameter calculation section changes a rate of change of the parameter of the consumption item according to the change of the setting.

According to another aspect of the present invention, there is provided a program for generating an image, the program causing a computer to function as:
a game processing section which performs a game processing based on operation data from a control section, and performs a processing to terminate a game when a game termination condition is satisfied;
a parameter calculation section which calculates a parameter of a consumption item which is consumed as a game progresses; and
an image generation section which generates a game image based on a result of the game processing,
wherein, when a setting of the game termination condition changes, the parameter calculation section changes a rate of change of the parameter of the consumption item according to the change of the setting.

According to a further aspect of the present invention, there is provided a computer-readable information storage medium storing one of the above described programs.

BRIEF DESCRIPTION OF THE SEVERAL VIEWS OF THE DRAWING

FIG. 1 is an example of a functional block diagram of an image generation system according to an embodiment of the present invention.

FIG. 3 shows an example of a setting scene for the number of laps and running performance.

DETAILED DESCRIPTION OF THE EMBODIMENT

Figure 2A:
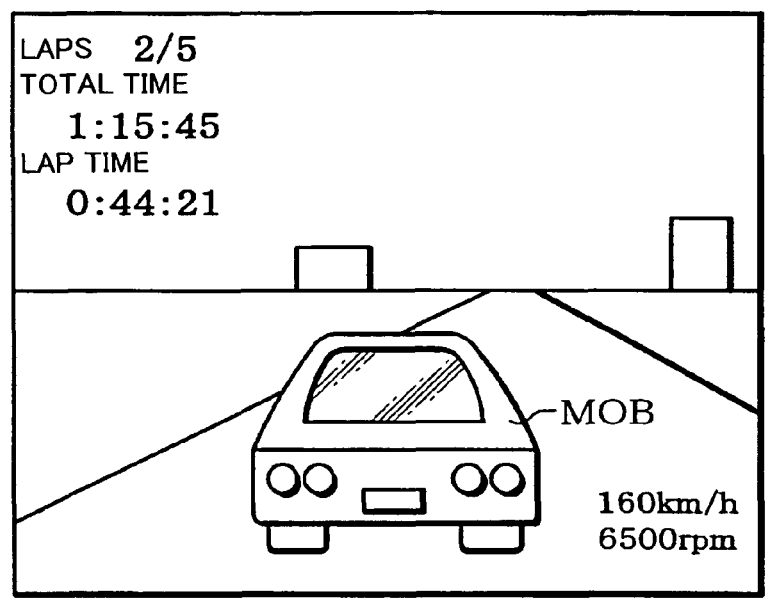
FIGS. 2A and 2B exemplify a game image and a course.

This embodiment will now be described with reference to the drawings. Note that the embodiments described below do not limit the scope of the invention defined by the claims laid out herein. In addition, not all of the elements of the embodiments described below should be taken as essential requirements of the present invention.

According to one embodiment of the present invention, there is provided an image generation system which generates an image comprising:

a memory which stores a program and data for generating an image; and at least one processor which is connected to the memory and performs a processing for generating an image, wherein the processor comprises:

a game processing section which performs a game processing based on operation data from a control section, and performs a processing to terminate a game when a game termination condition is satisfied;

a parameter calculation section which calculates a parameter of a consumption item which is consumed as a game progresses; and an image generation section which generates a game image based on a result of the game processing, wherein, when a setting of the game termination condition changes, the parameter calculation section changes a rate of change of the parameter of the consumption item according to the change of the setting.

According to another embodiment of the present invention, there is provided a program causing a computer to function as the above described sections.

According to a further embodiment of the present invention, there is provided a computer-readable information storage medium storing (or recording) the program causing a computer to function as the above described sections.

A game processing is performed based on operation data from a control section, thereby a game progresses. A game is finished when a game termination condition is satisfied. According to the present invention, a calculation processing of a parameter of a consumption item, which is consumed as a game progresses, is performed. When the setting of the game termination condition changes, the rate of change in the parameter of the consumption item changes according to the change of the setting. For example, when the game termination condition changes to hasten the end of the game, the rate of change in the parameter of the consumption item can be increased. When the game termination condition changes to delay the end of the game, the rate of change in the parameter of the consumption item can be decreased. Thus, for example, a value of the parameter of the consumption item at the end of the game can be controlled to be constant under the same condition and without depending on the game termination condition. Thus, the consumption simulation acceptable by a player can be realized.

In the image generation system, program, and information storage medium, the game termination condition may be a condition relating to the number of laps on a course, a time limit of a game, or a setting of a game quota, and the parameter calculation section may increase the rate of change of the parameter of the consumption item, as the number of laps on a course is reduced, as the time limit of a game is shortened, or as the game quota is reduced.

If the rate of change in the parameter of the consumption item is changed according to the setting of the number of laps, time limit or game quota, a more appropriate consumption simulation can be realized. The setting of the number of laps, time limit or game quota may be performed by a player by using a setting scene or the like, or performed automatically by the computer.

The image generation system, program, information storage medium may include (or may cause a computer to function as) an object control section which controls a movement or a motion of an object, and when a value of the parameter of the consumption item becomes equal to zero as a game progresses, the object control section may disable or limit a movement or a motion of an object.

With this configuration, the player can be effectively informed of that the consumption item has been consumed enough to disable or limit a movement or a motion of an object. This can also realize a more realistic consumption simulation.

In the image generation system, program, information storage medium, the game processing section may perform a processing for causing a player to set an initial value of the parameter of the consumption item, and the parameter calculation section may change the parameter of the consumption item from the initial value which has been set by a player.

With this configuration, a value of the parameter of the consumption item changes from an initial value set arbitrarily by the player. Even when the initial value has been set arbitrarily in such a manner, the rate of change in the parameter of the consumption item changes according to the change in the setting of game termination condition, thereby the consumption simulation that can be accepted by the player can be realized.

In the image generation system, program, information storage medium, the game processing section may perform a processing for causing a player to set the game termination condition, and the parameter calculation section may change the parameter of the consumption item with the rate of change specified based on the game termination condition which has been set by a player.

With this configuration, the value of the consumption item parameter changes with a rate of change specified based on the game termination condition which has been set arbitrarily by the player. Even when the game termination condition has been set arbitrarily in such a manner, the rate of change in the parameter of the consumption item changes according to the change in the setting of game termination condition, thereby the consumption simulation that can be accepted by the player can be realized.

In the image generation system, program, information storage medium, the parameter of the consumption item may be a parameter relating to a fuel, a part, a life or the number of bullets in a weapon.

Note that the parameter of the consumption item is not limited to the above described parameter of such a consumption item.

The embodiments of the present invention are described below in detail with reference to the drawings.

1. Configuration

FIG. 1 illustrates a functional block diagram of an image generation system (or game system) according to this embodiment. It is to be noted that the image generation system of this embodiment is not necessarily required to have all of the components (or sections) shown in FIG. 1, but part of the components (e.g., a control section 160, a portable information storage device 194, a communication section 196 or the like) can be omitted.

The control section 160 is used for a player to input operation data, and its function can be realized by hardware such as a lever, a button, a steering wheel, a shift lever, an accelerator pedal, a brake pedal, a microphone, a sensor, a touch panel type display or a housing.

A storage section 170 provides a working region for a processing section 100, a communication section 196 and the like, and its function can be realized by hardware such as a RAM.

An information storage medium 180 (which is a computer-readable medium) is intended to store a program, data and the like, and its function can be realized by hardware such as an optical disc (CD or DVD), a magnetic optical disc (MO), a magnetic disc, a hard disc, a magnetic tape, a memory (ROM), and the like. The processing section 100 performs various kinds of processings according to this embodiment, based on a program (or data) stored in this information storage medium 180. In other words, a program for causing a computer to function as various sections according to this embodiment (or a program for causing a computer to perform the processing of each of the sections) is stored (recorded, saved) in the information storage medium 180.

A display section 190 is intended to output an image which is generated according to this embodiment, and its function can be realized by hardware such as a CRT, an LCD, a touch panel type display, an HMD (head mount display) or the like.

A sound output section 192 is intended to output a sound generated according to this embodiment, and its function can be realized by hardware such as a speaker or a headphone.

A portable information storage device 194 is intended to store player's personal data and game save data and the like. This portable information storage device 194 may be in the form of a memory card or a portable game device.

The communication section 196 is intended to perform various controls for communication between the present image generation system and the outside (e.g., a host device or another image generation system), and its function can be realized by hardware, such as a various kinds of processors and communicating ASIC, a program or the like.

The program (or data) for causing a computer to function as each section in this embodiment may be delivered from an information storage medium having a host device (or server) to the information storage medium 180 (storage section 170) through a network and communication section 196. Use of the information storage medium in such a host device (or server) can also fall within the scope of the present invention.

The processing section 100 (or processor) performs various processings such as game processing, image generation processing, sound generation processing and other processings, based on the operation data from the control section 160 or a program. In such a case, the processing section 100 uses a main storage section 172 in the storage section 170 as a work region for various processing. The function of this processing section 100 can be realized by hardware such as various processors (CPU, DSP and the like) or ASIC (gate array or the like) or a program (or game program).

The processing section 100 comprises a game processing section 110, an object control section 112, a parameter calculation section 114, an image generation section 120 and a sound generation section 130.

The game processing section 110 performs various kinds of game processings for generating a game image, based on the control data from control section 160 (or game controller). Such game processings may include, for example, a processing for setting a game start condition (including selection of the number of participating players, selection of a course and map or selection of an object to be used by a player), a processing for setting a game termination condition (including the number of laps in a course, a time limit in a game or a quota in a game), a processing for starting a game if the game start condition is satisfied, a processing for advancing a game, a processing for arranging objects (display things) used in a game, a processing for displaying objects, a processing for calculating game results and a processing for terminating a game if the game termination condition is satisfied.

The object control section 112 (or simulation calculation section or movement/motion calculation section) controls an object (or moving object). For example, the object control section 112 may be operative to determine movement information of the object (or moving object) which includes positional information, direction information, speed information and acceleration information). That is to say, the object control section 112 may cause the object to move within an object space, based on the operation data inputted by the player through the control section 160 or according to a game program.

More particularly, the object control section 112 is operative to change the position and rotation angle (or direction) of the object, for example, every one frame (e.g., 1/60 seconds). For example, it is assumed herein that the position (X-, Y- or Z-coordinate) and rotation angle (about X-, Y- or Z-axis) of an object in a frame (k−1) are Pk−1 and θk−1 respectively and that the amount of change in the position of the object (speed) and amount of change in the rotation of the same (rotational seed) at one frame are ΔP and Δθ respectively. Then, the position Pk and rotation angle θk of the object in a frame k may be determined as shown in the following formulae (1) and (2):

$$Pk = Pk-1 + \Delta P \qquad (1)$$

$$\theta k = \theta k-1 + \Delta \theta \qquad (2)$$

Note that the processing performed in the object control section 112 is not limited to the above formulae (1) and (2), but may be carried out according to any other formulae equivalent to the formulae (1) and (2).

The object control section 112 is also to determine motion information of the object (or moving object) which includes positional and directional information for each part in the object). That is to say, the object control section 112 causes the object to perform its action (motion or animation), based on the operation data inputted by the player through the control section 160 or a game program.

More particularly, the object control section 112 performs a processing for generating the motion of the object, based on motion data. That is to say, the object control section 112 reads motion data including the position and rotation angle (or direction) of each of part objects (or bones defining a skeleton) which form an object (model object, skeleton or character), out of the storage section 170 (motion data storage section). The motion of the object is reproduced by moving each part object (or bone) of the object (or by deforming the skeleton).

The parameter calculation section 114 calculates various parameters such as consumption item parameters. Here, the consumption item is intended to represent any virtual thing to be consumed in a game with its progress. Such a consumption item may include fuel, part, life (physical strength), the number of bullets in a weapon (or the remaining number of weapons), commodities and resources.

The fuel is virtually charged into the object, for example, for performing the simulation of a movement and motion of the object (or moving object). If the parameter value of this fuel (which may be referred to "consumption item" in a broad sense) becomes equal to zero, the object is disabled from moving and/or acting. The part is one that is mounted on the object and may include a tire, a suspension, a vehicle body, a brake, an engine, a wing and a weapon. The part will degrade its performance with the movement and/or motion of the object. The life is intended to represent the durability (or physical strength) of an object (a human fighter, a robot, an airplane or a spaceship) in a fighting game, a robot combating game, a flight game or a spaceship game. If the parameter value of this life becomes equal to zero, for example, the object will be disabled from moving and/or acting (or knocked down). Therefore, the battle is decided and the game is finished. The number of bullets is counted down in a weapon used by the object. The weapon may include a missile, a gun, a machine gun, a laser and the like. If the bullets have been consumed, the weapon will be disabled. The commodities and resources are used in a strategic simulation game or the like.

In this embodiment, if the game termination condition (game clear condition or game setting) is changed, the parameter calculation section 114 correspondingly changes the rate of change in the parameter of the consumption item (rate of consumption or rate of reduction). More particularly, if it is assumed that the game termination condition relates to the number of laps (or the maximum number of laps required by one game play), a time limit (or time period measured from the start of a game to the termination of the game) or a game quota (or a quota to be attained by a player in a game), the rate of change in the parameter of the consumption item is increased as the number of laps to be attained (or the maximum number of laps) is decreased, as the time limit is shortened or as the game quota is reduced. Thus, even if the game termination condition is changed, the game can be adjusted for the value of the consumption item parameter to be equal to about zero at the termination of game. This can realize a consumption item simulation with a little unnaturalness.

The image generation section 120 draws and generates a game image, based on the results of various processings (or game processings) which have been performed by the processing section 100, the generated image being then outputted toward the display section 190. That is to say, if a so-called three-dimensional game image is to be generated, a geometry-processing such as coordinate transformation, clipping processing, perspective transformation or light-source processing is first executed. The result of such a processing is then used to create drawing data (positional coordinates of a vertex in a primitive face, texture coordinates, color data, normal vector or alpha-value). Based on this drawing data (or primitive face data), the image of the perspective-transformed (or geometry-processed) object (which may consist of one or more primitive faces) is then drawn in a drawing buffer 174 (which may be a frame or work buffer for storing the image information by pixel unit). Thus, such an image as viewed from a virtual camera (or given viewpoint) in the object space can be generated.

The sound generation section 130 processes sounds to generate game sounds such as BGM's, sound effects or voices, based on various processings performed in the processing section 100, the generated game sounds being then outputted toward the sound output section 192.

The image generation system of this embodiment may be dedicated for a single-player mode in which only one player can play a game. In addition to such a single-player mode, it may be operated in a multi-player mode in which a plurality of players can play a game.

If a plurality of players play a game, one terminal may be used to generate game images and sounds to be provided to these players. Alternatively, these game images and sounds may be generated using a plurality of terminals (game machines or cellular phones) which are interconnected through a network (transmission line or telecommunication line).

2. Technique of this Embodiment

A technique of this embodiment will now be described with reference to the drawings.

2.1 Summary of Game

Figure 2B:
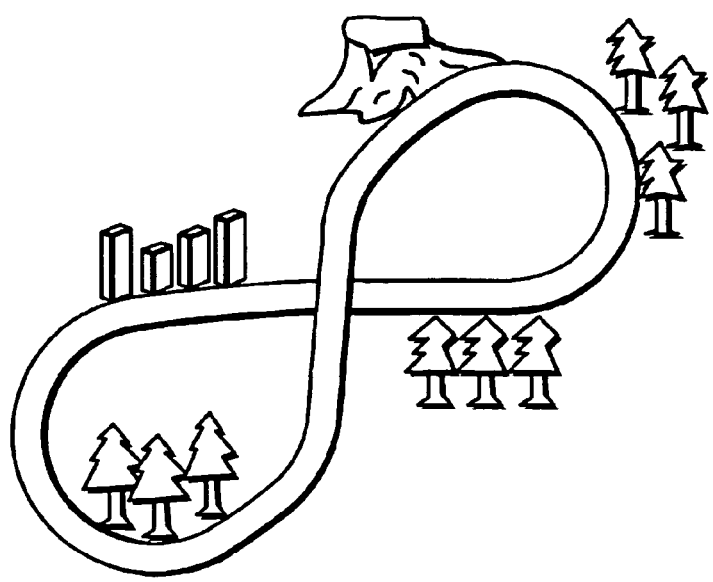

FIG. 2A shows a game image generated according to this embodiment. In this embodiment, a player operates an object MOB (or motorcar) to run a course. And, the player competes against another object (or enemy motorcar) operated by another player for order or lap time. FIG. 2B shows a course on which the object (or moving object) MOB moves.

In this embodiment, the player sets various game start conditions (game modes) using such a setting scene as shown in FIG. 3, before the game starts. More particularly, the player selects the number of laps (or the maximum number of laps) and sets the running performance of the object, as shown by A1 in FIG. 3. For example, if the number of laps is set to be three and when the object has run three laps in the course, one partitioned game section is finished. If the number of laps is set to be five and when the object has run five laps in the course, another partitioned game section is finished.

By adjusting the parameters for an accelerator, brake and handling as shown by A2 in FIG. 3, the relationship between the degree of depression in the accelerator and the engine output, the relationship between the degree of depression in the brake and the braking force and the relationship between the degree of steering in the steering wheel and the degree of turn at the corners can be adjusted.

By adjusting the parameter of fuel, the initial amount of fuel in the object (or motorcar) which is equivalent to the initial value of fuel parameter can also be adjusted. For example, if the amount of fuel to be charged is increased, it is advantageous in that the run is increased while it is disadvantageous in that the weight of the object (or vehicle body) is increased. If the amount of fuel to be charged is reduced, it is advantageous in that the weight of the object is reduced while it is disadvantageous in that the run decreases. The player must decide the initial amount of fuel to be charged in consideration of these advantages and disadvantages.

In FIG. 3, the initial amount of fuel to be charged may be specified in percentage rather than absolute value. In other words, the player specifies the percentage (ratio) of the initial amount of fuel to be charged relative to the amount of full charged fuel. If the initial amount of fuel to be charged is set, for example, by 90% (which is, in a broad sense, P percentage), the fuel consumption is adjusted so that the object can run the course by the maximum number of laps in the average driving. In addition, the initial amount of fuel to be charged (or initial value of the fuel parameter) may be set to be able to specify in the absolute amount.

Figure 4:
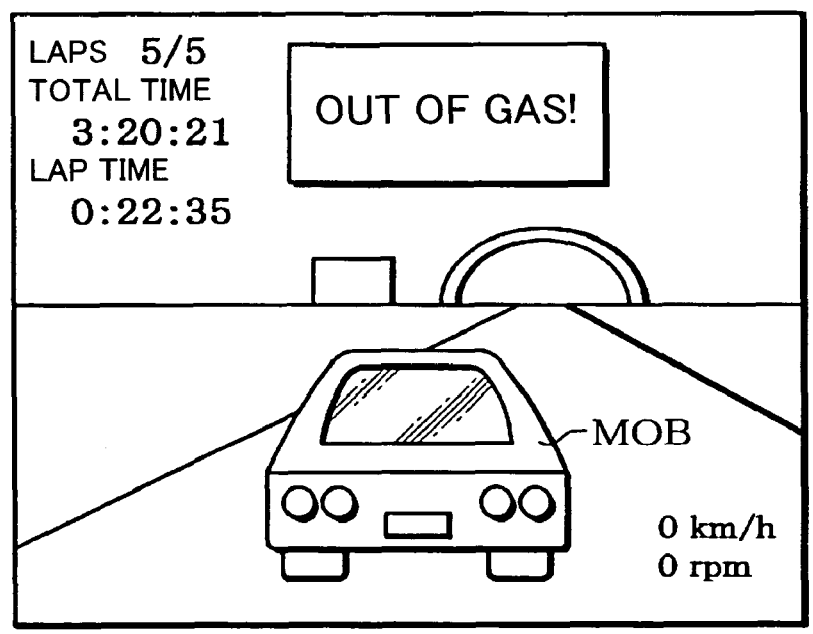
FIG. 4 illustrates an out-of-gas processing.

If the fuel has been consumed as by setting the initial amount of fuel to be charged in a percentage than 90%, the object MOB is disabled from moving or acting due to out of gas as shown in FIG. 4. Then, the player is regarded as retiring from the race and the game for that player finishes. Thus, the player will engage in a race after the object has had the minimum amount of fuel sufficient to avoid the out-of-gas and also to reduce the weight of the object or vehicle body.

2.2 Setting of the Rate of Change in the Parameter of the Consumption item Depending on the Game Termination Condition It has been found that there is created the following undesirable situation if the consumption of a consumption item such as fuel is to be simulated faithfully for the event of the actual world.

That is to say, in the consumption of fuel in the actual world, the rate of reduction of the fuel should be invariable under the same condition. For example, it is assumed herein that the rate of reduction in the fuel parameter (which is, in a broad sense, the rate of change) is set so that all the charged fuel will be consumed when the object has moved the course by five laps with the average driving. In other words, it is assumed that whenever the object has moved the course by one lap, the rate of fuel reduction is set to be decreased by ⅕.

In such a case, if the fuel consumption is simulated faithfully for the event of the actual world, the fuel should be consumed with the same rate of reduction as that when the five laps are set, even when the player sets the number of laps to be two laps through the setting scene of FIG. 3. Therefore, if the number of laps was set to be two, a situation in which the fuel is not fully consumed will be created even when two laps are over at the goal. Therefore, the weight of the object in the final lap when the number of laps is set to be five will different from that when the number of laps is set to be two. This creates a differential lap time. Thus, the game result (lap time) of the player will be incorrect. On the other hand, it is assumed that the rate of reduction in the fuel parameter is set so that all the fuel will be consumed when the object moves the course by only two laps. If the player sets the number of laps to be five through the setting scene of FIG. 3, thus, the fuel consumption will be accelerated. This creates a situation in which the weight of the object is dully reduced or the out-of-gas occurs on the way of the course.

To overcome such problems, this embodiment changes the rate of change in the parameter of the consumption item depending on the setting of the number of laps (which, in a broad sense, is the game termination condition).

Figure 5A:
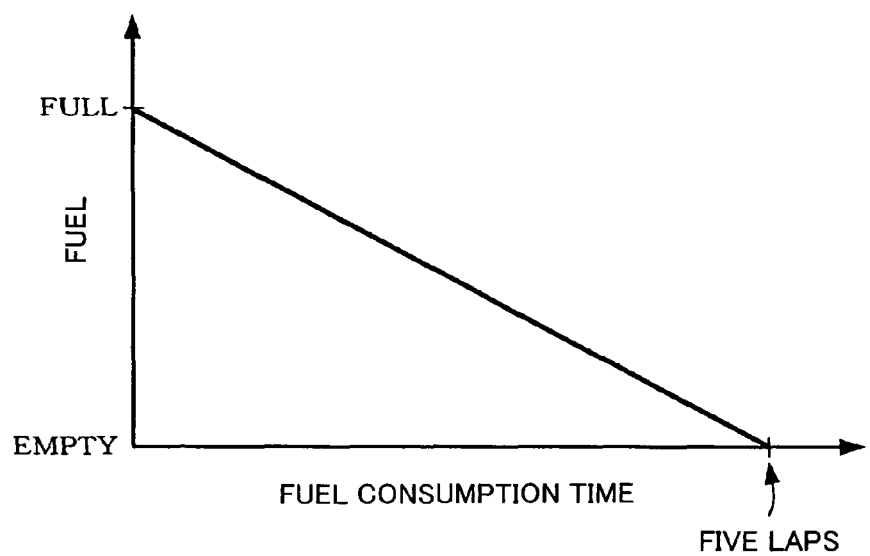
FIGS. 5A and 5B illustrate a technique of changing a rate of fuel reduction depending on the number of laps.

More particularly, if the number of laps (the maximum number of laps) is set to be five (which, in a broad sense, K lap), the rate of reduction in the fuel parameter is reduced (e.g., to the normal value) as shown in FIG. 5A. That is to say, the rate of reduction in the fuel parameter is set so that when the object runs the course by five laps (or K laps), the value of the fuel parameter becomes equal to about zero. In other words, the rate of reduction is set so that when the object runs by one lap, the fuel will be reduced by ⅕ (1/K) of the initial amount of fuel to be charged.

Figure 5B:
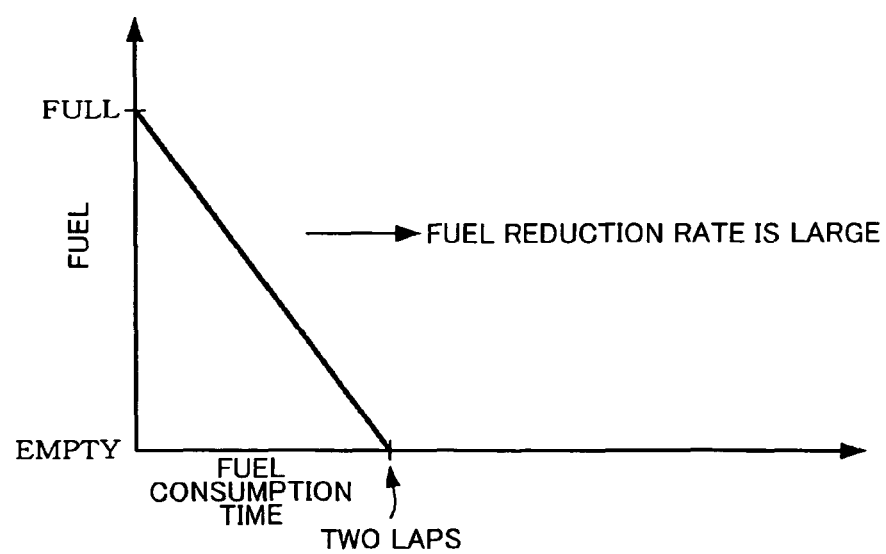

On the other hand, if the number of laps is set to be two (which is, in a broad sense, L laps, L<K), the rate of reduction in the fuel parameter is set to be larger than that in the case of five laps (K laps), as shown in FIG. 5B. That is to say, the rate of reduction in the fuel parameter is set so that when the object runs the course by two laps (or L laps), the value of the fuel parameter becomes equal to about zero. In other words, the rate of reduction is set so that the fuel will be reduced by ½ (1/L) of the initial amount of fuel to be charged.

Thus, even if the number of laps is set to any number of laps, all the fuel will substantially be consumed at a point approximate to the end of the final lap when the object has run the course by the set number of laps (if the initial amount of fuel to be charged is set 90% in FIG. 3). Therefore, the occurrence of an unnatural situation due to change in the number of laps can be prevented effectively. This can realize a new simulation of fuel consumption.

2.3 Game Termination Condition

The game termination condition for changing the rate of change in the parameter of the consumption item may include any one of various other conditions in addition to the condition relating to the number of laps in a course.

Figure 6A:
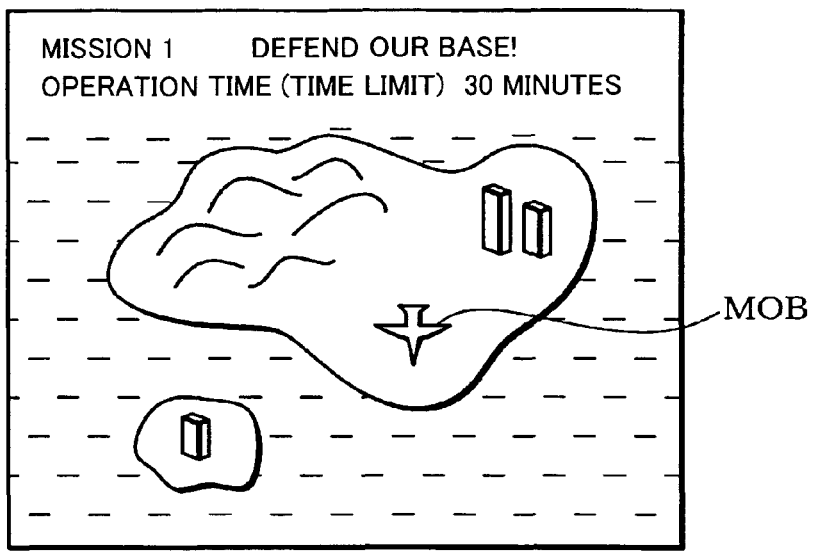
FIGS. 6A and 6B illustrate a technique of changing a rate of fuel reduction, a rate of bullet reduction and the like depending on an operation time.

For example, in FIG. 6A, a player controls an object (airplane) MOB to clear a mission within a constant operation time (which is, in a broad sense, time limit). When the mission is successfully cleared within the operation time or when the mission is not cleared and the operation time has elapsed, the game termination condition will be satisfied to finish the game.

In this case, this embodiment changes the rate of fuel reduction in the object MOB, the rate of bullet reduction in the object MOB or the rate of damage when the object MOB is shot (in a broad sense, when it is attacked), depending on the operation time which is one of the game termination conditions. More particularly, the rate of fuel reduction, the rate of bullet reduction or the rate of shot damage is increased as the operation time is reduced, as shown in FIG. 6B.

Figure 6B:
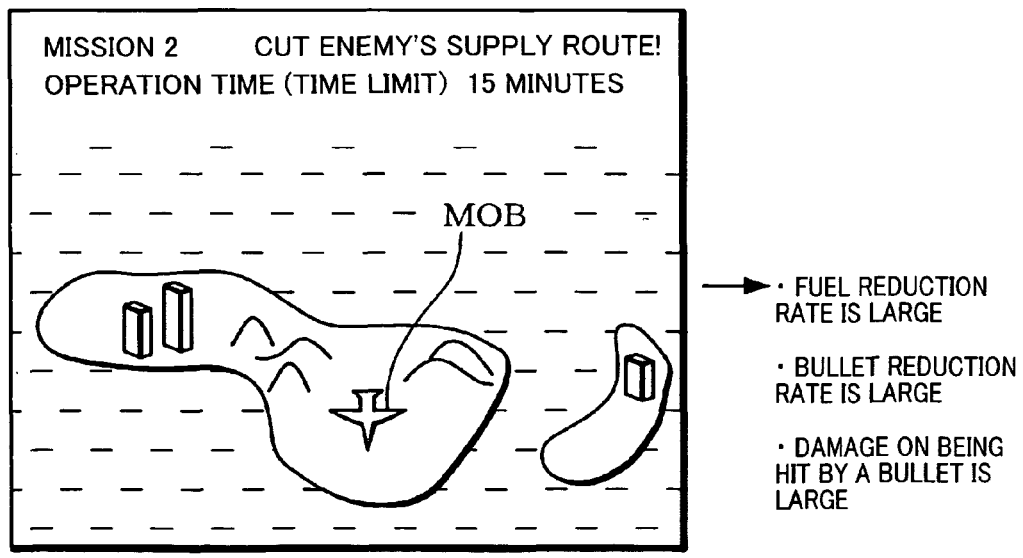

In such a manner, the fuel, the bullets or the life (which is equivalent to the physical strength or durability) has just been consumed substantially when the operation time elapses (when the game is over) even if the operation time is longer (FIG. 6A) or even if the operation time is shorter (FIG. 6B). Therefore, occurrence of an unnatural situation due to the changed operation time (or time limit) can be prevented, thereby providing a new consumption simulation.

Figure 7A:
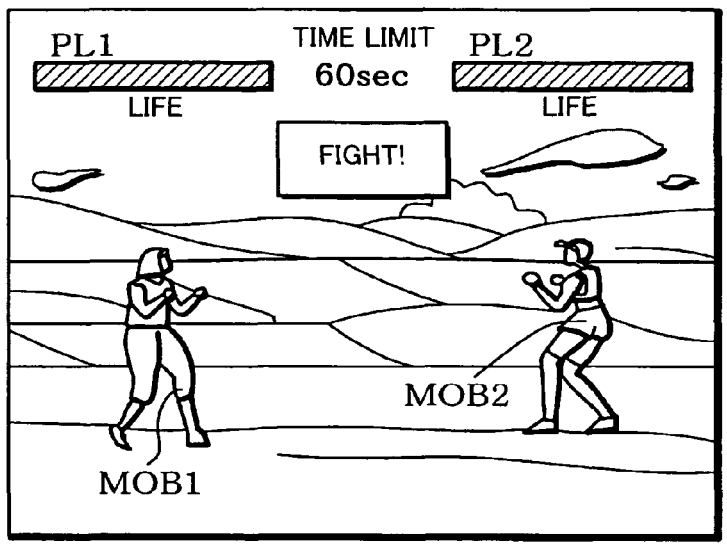
FIGS. 7A and 7B illustrate a technique of changing a rate of life reduction depending on a time limit.

In FIG. 7A, one player (the first player) PL1 operates an object (a character representing a human fighter) MOB1 while the other player (the second player) PL2 operates an object MOB2. Thus, they will play a fighting game. If the life value of one of the objects MOB1 and MOB2 becomes equal to zero within a time limit or if the time limit has elapsed, the game termination condition will be satisfied to finish the game. In this case, this embodiment changes the rate of life reduction (or the rate of damage) when each of the objects MOB1 and MOB2 is attacked, depending on the time limit that is one of the game termination conditions. More particularly, the rate of life reduction when the object is attacked is increased as the time limit is reduced, as shown in FIG. 7B.

Figure 7B:
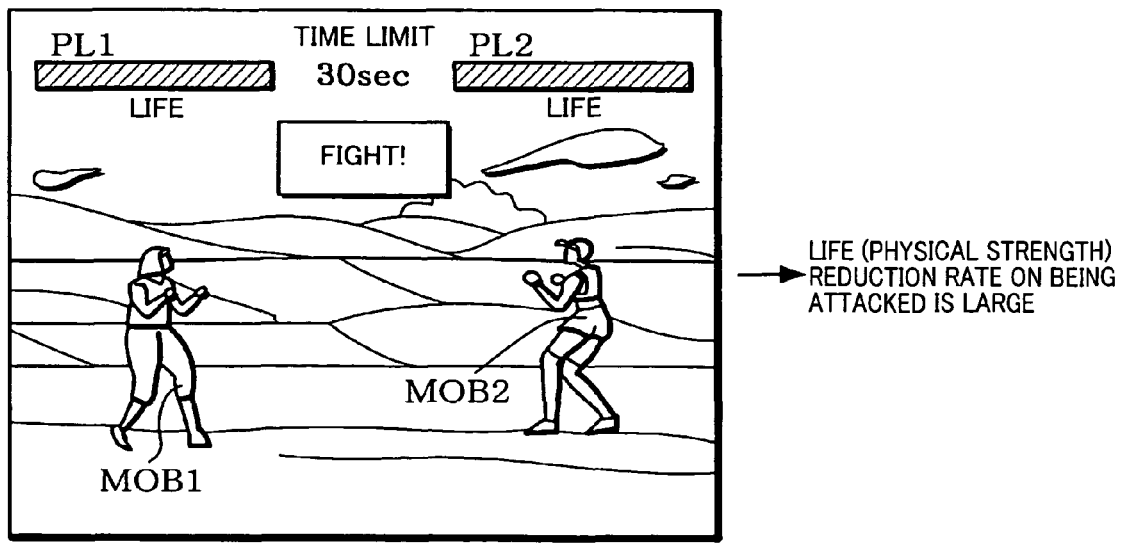

In such a manner, the fighting game will be determined about when the time limit elapses (or when the game is over even if the time limit is longer (FIG. 7A) or if the time limit is shorter (FIG. 7B). This provides a fighting game acceptable for the players.

The game termination condition may be a condition relating to any game quota other than the conditions relating to the aforementioned game norms including the number of course laps and the game time limit, the game quota being intended to mean any one that should be attained by the player in the game. For example, the game termination condition may relate to the number of enemies to be brought down or the number of questions to be answered.

What is represented by the consumption item parameter in this embodiment are not limited to the fuel, the life, the number of bullets (or remaining bullets). For example, the consumption item parameter may be used to represent the consumption of parts mounted on the object (e.g., tires, suspensions, vehicle bodies, brakes or engines) or the consumption of commodities and resources in a strategic simulation game. For example, Depending on the change in the game termination condition (the number of laps, the time limit, the game quota or the like), the rate of change in tire grip, the rate of characteristic change in fatigued suspension, the rate of damage in crashed vehicle body, the rate of braking pad reduction, the rate of engine output reduction, the rate of failure occurrence or the rate of commodity or resource reduction under the same condition may be changed.

2.4 Processing when the Value of a Consumption Item Parameter Becomes Equal to Zero This embodiment disables or limits the movement and/or motion of an object if the value of a consumption item parameter becomes equal to zero with progress of game.

Figure 8:
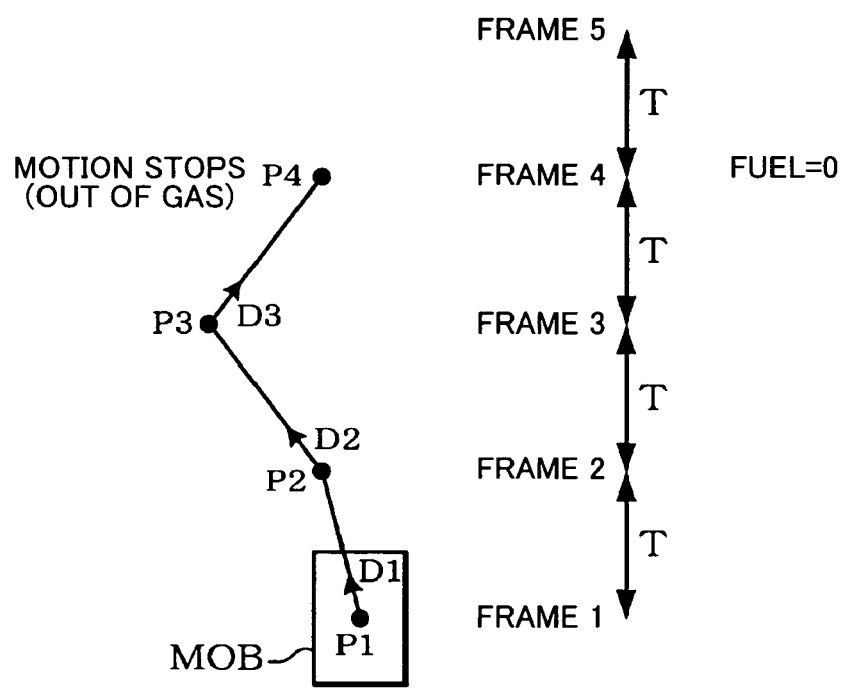
FIG. 8 illustrates a process of disabling a movement and a motion of an object.

For example, in FIG. 8, this embodiment determines the information of movement for the object (which may include position, direction, speed or acceleration), based on the operation data from the control section and performs a processing for moving the object MOB in the object space every frame cycle T (1/60 seconds). In other words, a simulation (mathematical calculations) in accordance with a predetermined algorithm is used to determine the positions P1, P2, P3, P4, P5 ... and directions (angles) D1, D2, D3, D4, D5 ... of the object MOB in frames 1, 2, 3, 4, 5 ..., respectively. For example, the position P2 in the frame 2 can be determined based on the position P1 and speed (or distance for which the object moves in the frame cycle T) in the frame 1. This speed can be determined based on the acceleration or aerodynamic drag or friction drag. The acceleration can be determined based on the degree of accelerator pedal depression (or engine output) or the degree of brake pedal depression (or braking ability).

In this embodiment, if the parameter of the fuel (which is, in a broad sense, a consumption item) becomes equal to zero, the movement of the object MOB is disabled. More particularly, in the simulation of FIG. 8, the acceleration and speed become equal to zero. Thus, the object MOB stops. Therefore, an event in which the object MOB is disabled from running due to out-of-gas can be simulated. A player must drive while caring about the amount of fuel so that the out-of-gas does not occur. This can improve the reality in the race game.

If such an event as the out-of-gas is to be simulated faithfully for the real world, the rate of reduction in the fuel parameter is invariable with the same degree of accelerator pedal depression. Therefore, the value of the fuel parameter will be equal to zero within a predetermined time of fuel consumption without depending on the number of laps (the maximum number of laps). Thus, the object MOB becomes out of gas. This cannot be accepted by the player.

In respect to this point, as described in connection with FIGS. 5A and 5B, this embodiment increases the rate of fuel reduction as the number of laps is decreased. Therefore, the out-of-gas event can be created in the vicinity of the end in the final lap even if the number of laps is set either of five or two. This can realize a race game acceptable for the players.

If the value of the consumption item parameter becomes equal to zero, the object may be disabled from acting rather than moving. More particularly, the mode of the object is changed to another mode in which the object is disabled from acting. In a fighting game, for example, an object (or character) falls down (or is knocked down) and placed in its disabled state.

A movement or a motion of an object will not completely be disabled, but may be merely limited if the value of the consumption item parameter becomes equal to zero. For example, if the value of the consumption item parameter becomes equal to zero, the speed of the object may extremely be decreased or the motion thereof may extremely be delayed. Alternatively, it may be designed that the object will not respond the operation of the player. Furthermore, the offensive or defense power of the object may extremely be reduced.

Thus, an event which occurs when the value of the consumption item parameter becomes equal to zero can be represented effectively.

3. Processing According to this Embodiment

The details of a processing according to this embodiment will now be described with reference to flow charts shown in FIGS. 9 and 10.

Figure 9:
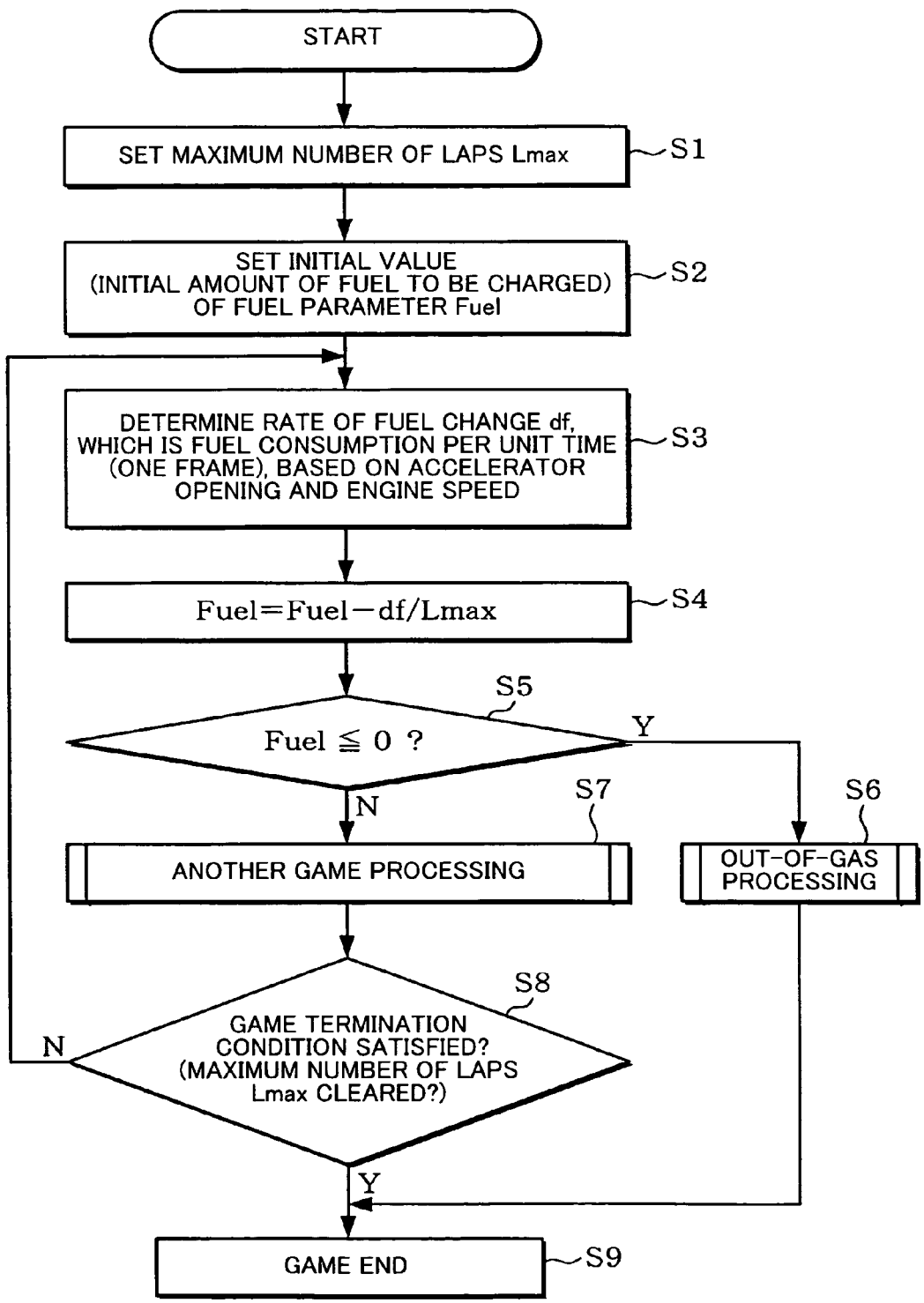
FIG. 9 shows an example of a flow chart illustrating a process according to an embodiment of the present invention.

FIG. 9 is a flow chart illustrating a process of changing the rate of change in the fuel parameter (which is, in a broad sense, consumption item parameter) based on the setting of the number of laps (which is, in a broad sense, game termination condition).

First of all, the maximum number of laps Lmax is set and an initial value (or initial amount of fuel to be charged) of a fuel parameter Fuel is set (steps S1 and S2). The initial value of the fuel parameter Fuel and the maximum number of laps Lmax may be set by a player as shown in FIG. 3 or automatically by a computer.

Figure 11:
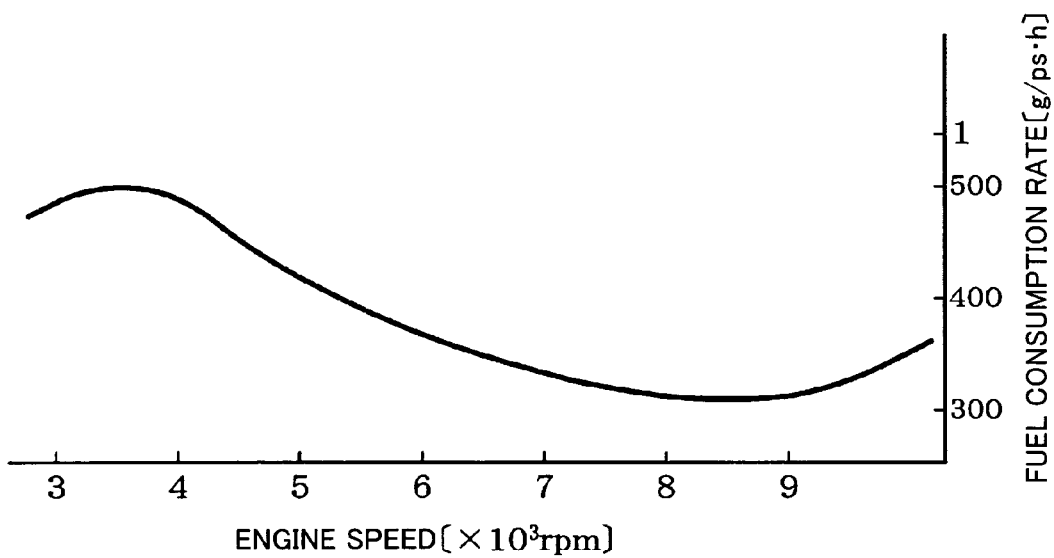
FIG. 11 shows an example of a relationship between the engine speed and the rate of fuel consumption.

The rate of fuel change df which is the fuel consumption per unit time (one frame) is then determined based on accelerator opening and engine speed (step S3). More particularly, the rate of fuel change df which is the fuel consumption per unit time is determined based on the relationship between engine speeds and fuel consumptions as shown in FIG. 11.

Operation of Fuel=Fuel-df/Lmax is then performed (step S4). That is to say, the fuel (consumption item) parameter Fuel is changed (or reduced) from the initial value set by the player (or computer) in the step S2. In this case, the fuel change df is divided by Lmax. That is to say, the fuel (consumption item) parameter Fuel is changed according to the rate of change df/Lmax which has been specified based on the maximum number of laps Lmax (game termination condition) set by the player (or computer). Thus, as described in connection with FIGS. 5A and 5B, the rate of fuel change can be changed (reduced) depending on the change (reduction) in the number of laps.

It is then determined whether or not Fuel$\leq$0 (step S5). If Fuel$\leq$0, a processing for out-of-gas processing is carried out as described in connection with FIGS. 4 and 8 (step S6). That is to say, a movement or a motion of the object will be disabled or limited. If the object (motorcar or motorcycle) became out-of-gas, it is determined that the game termination condition is satisfied, thereby the game finishes (step S9).

On the other hand, if Fuel>0, any other game processing (which includes a processing for advancing the game, a processing for moving the object, a processing for causing the object to act or a processing for displaying the object) is executed (step S7). It is then determined whether or not the game termination condition is satisfied (step S8). More particularly, it is determined, for example, whether or not the object (motorcar or motorcycle) has run by the maximum number of laps Lmax. The program is returned to the step S3 if the game termination condition is not satisfied. On the other hand, the game is finished if the game termination condition is satisfied (step S9).

Figure 10:
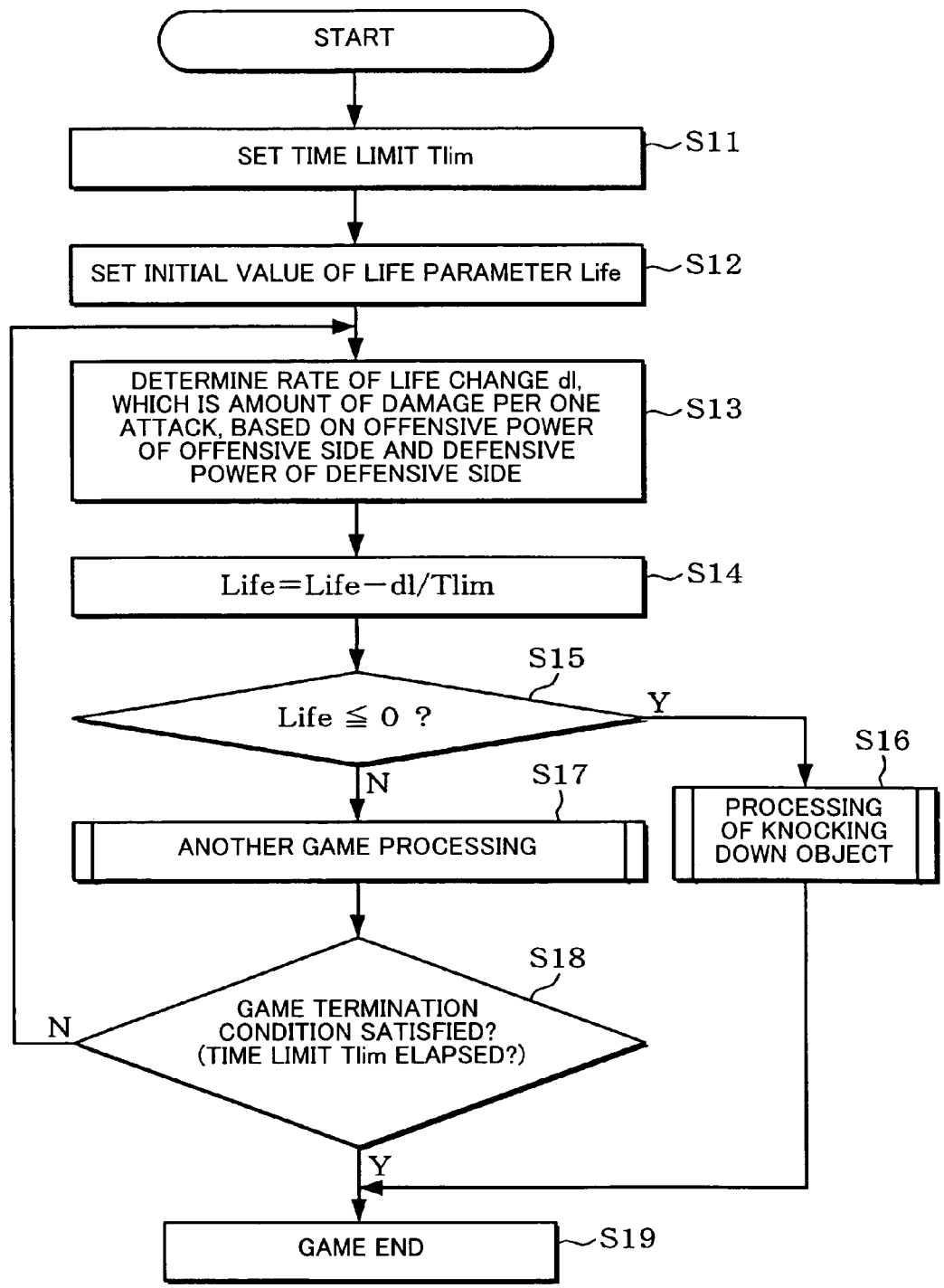
FIG. 10 shows an example of a flow chart illustrating another process according to an embodiment of the present invention.

FIG. 10 is a flow chart illustrating a process of changing the rate of change in the life parameter (which is, in a broad sense, consumption item parameter) based on the setting of the time limit (which is, in a broad sense, game termination condition).

First of all, time limit Tlim is set and an initial value of a life parameter Life is set (step S11 and S12). The time limit Tlim and the initial value of the life parameter Life may be set by the player or automatically by a computer.

A rate of life change dl, which is an amount of damage per one attack, is then determined based on the offensive power of the offenses side (one object) and the defense power of the defense side (the other object) (step S13).

Operation of Life=Life-dl/Tlim is carried out (step S14). That is to say, the life (consumption item) parameter Life is changed (or reduced) from the initial value set by the player (or computer) in the step S2. In this case, this embodiment divides the rate of life change dl by Tlim. That is to say, the life (consumption item) parameter Life is changed according to the rate of change dl/Tlim which has been specified based on the time limit Tlim (game termination condition) set by the player (or computer). Thus, the rate of life change can be changed (reduced) depending on the change (reduction) of the time limit.

It is then determined whether or not Life≦0 (step S15). If Life≦0, a processing for knocking down the object (or character) (step S16). That is to say, a movement or a motion of the object will be disabled or limited. When the object is knocked down, it is determined that the game termination condition is satisfied. The game finishes (step S19).

On the other hand, if Life>0, any other game processing (which includes a processing for advancing the game, a processing for moving the object, a processing for causing the object to act or a processing for displaying the object) is executed (step S17). It is then determined whether or not the game termination condition is satisfied (step S18). More particularly, it may be determined, for example, whether or not the time limit Tlim elapses. The program is returned to the step S13 if the game termination condition is not satisfied. On the other hand, the game finishes if the game termination condition is satisfied (step S19).

4. Hardware Layout

Figure 12:
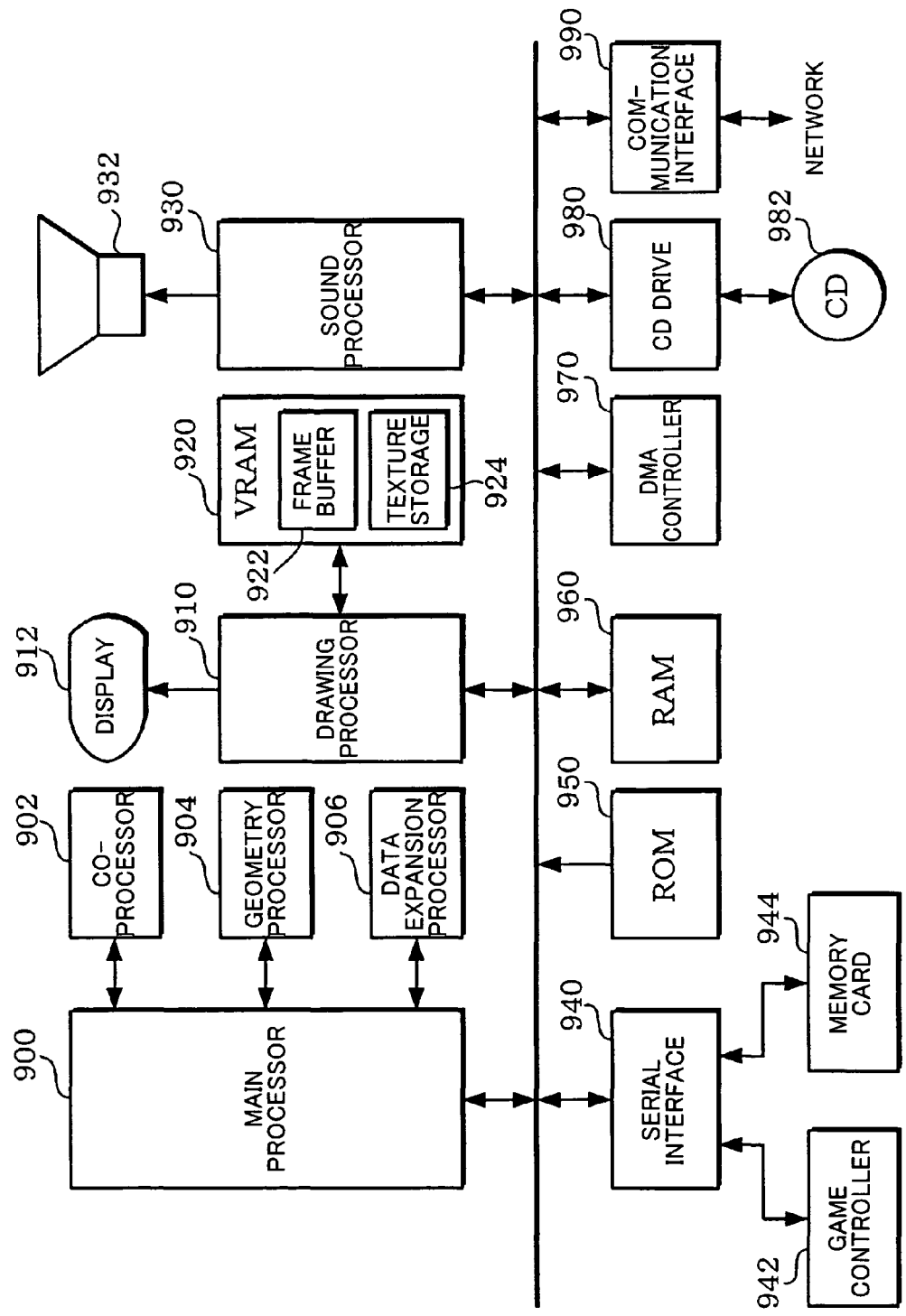
FIG. 12 shows an example of hardware configuration.

A layout of hardware which can be realized according to this embodiment will be described with reference to FIG. 12.

A main processor 900 operates to execute various processings such as game processing, image processing, sound processing and other processings according to a program stored in a CD 982 (information storage medium), a program transferred through a communication interface 990 or a program stored in a ROM 950 (which is an information storage medium).

A co-processor 902 is operative to assist the processing in the main processor 900 and has a product-sum operator or divider which can execute a high-speed parallel operation to perform a matrix (or vector) operation in high speed. For example, if the physical simulation for causing the object to perform its movement or motion requires a processing such as matrix operation, a program running on the main processor 900 instructs or commissions the co-processor 902 to do that processing.

A geometry processor 904 is operative to execute the coordinate transformation, perspective transformation, light source calculation or geometry-processing such as curved surface generation and has a product-sum operator or divider which can execute a high-speed parallel operation to perform a matrix (or vector) operation in high speed. For example, if such a processing such as coordinate transformation, perspective transformation or light source calculation is to be performed, the program running on the main processor 900 instructs or commissions the geometry processor 904 to do that processing.

A data expansion processor 906 is to perform a decoding process for expanding compressed image and sound data or a process for accelerating the decoding process in the main processor 900. Thus, moving images compressed by MPEG method or the like can be displayed in the opening, intermission, ending or game scene. In addition, the image and sound data to be decoded may be stored in ROM 950 and/or CD 982 or may externally be transferred through the communication interface 990.

A drawing processor 910 is to draw or render an object constructed by primitive faces such as polygons or curved surfaces at high speed. On drawing the object, the main processor 900 utilizes the function of a DMA controller 970 to deliver the object data to the drawing processor 910 and to transfer them to a texture storage section 924, if necessary. Then, the drawing processor 910 draws the object in a frame buffer 922 at high seed while performing the hidden surface removal based on these object data and textures. The drawing processor 910 can also perform α-blending (semi0transparent processing), depth cueing, mip-mapping, fog processing, bilinear filtering, trilinear filtering, anti-aliasing, shading processing. Once an image for one frame has been written in the frame buffer 922, that image is displayed on a display 912.

A sound processor 930 includes a multi-channel ADPCM sound source or the like and generates high-quality game sounds such as BGMs, sound effects and voices. The generated game sounds are then outputted through a loud speaker 932.

Operation data from a game controller 942 (which may be in the form of a lever, button, housing, pad type controller or gun type controller), save data from a memory card 944 and personal data are transferred through a serial interface 940.

A system program and the like have been stored in the ROM 950. In an arcade game system, the ROM 950 may function as an information storage medium and have stored various programs. A hard disk may be used in place of the ROM 950.

A RAM 960 is used as working area for various processors.

The DMA controller 970 controls DMA transfer between the processors and the memories (RAM, VRAM, ROM and the like).

A CD drive 980 drives the CD 982 (information storage medium) which has stored programs, image data, sound data and the like and enables access to these programs and data.

A communication interface 990 is an interface for performing the data transfer between the present system and an external through a network. In this case, the network connected to the communication interface 990 includes a telecommunication line (analog phone line or ISDN) and a high-speed serial bus. Data transfer through Internet is enabled by using the telecommunication line. Data transfer can also be carried out between the present system and any other image generation system by using the high-speed serial bus.

Each section (or means) of this embodiment may be realized all only with hardware or only by a program which has been stored in the information storage medium or a program delivered through the communication interface. Alternatively, they may be realized both in hardware and by program.

If each section in this embodiment is to be realized both with hardware and by program, the information storage medium may have stored a program for causing the hardware (or computer) to function as each section of this embodiment. More particularly, the aforementioned program instructs the respective processors 902, 904, 906, 910, 930 and the like to execute the processing and delivers the data to them, if necessary. Each of the processors 902, 904, 906, 910, 930 and the like will realize the corresponding one of the functional sections and sections and/or portions of the present invention, based on the instructions and delivered data.

Figure 13A:
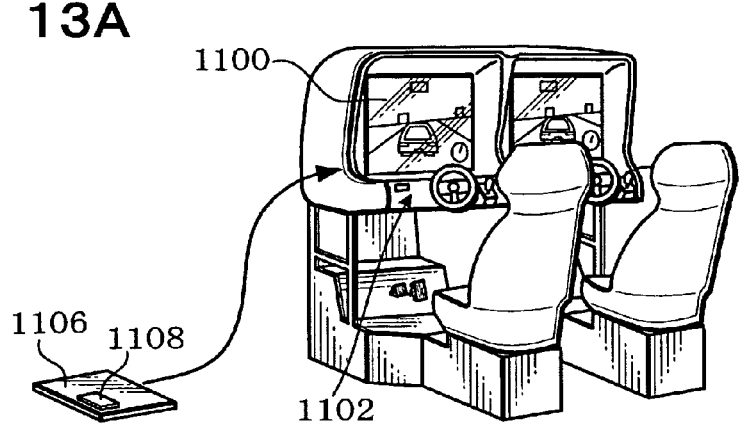
FIGS. 13A to 13C show examples of various forms of systems.

FIG. 13A shows an arcade game system (image generation system) to which this embodiment is applied. Players enjoy a game by operating control sections 1102 (including levers and buttons) while viewing a game scene displayed on a display 1100. A system board (or circuit board) included in the game system includes various processors and memories. The program (or data) for realizing the respective sections of this embodiment has been stored in a memory 1108 which is an information storage medium on the system board 1106. This program will be referred to as stored program (stored information).

Figure 13B:
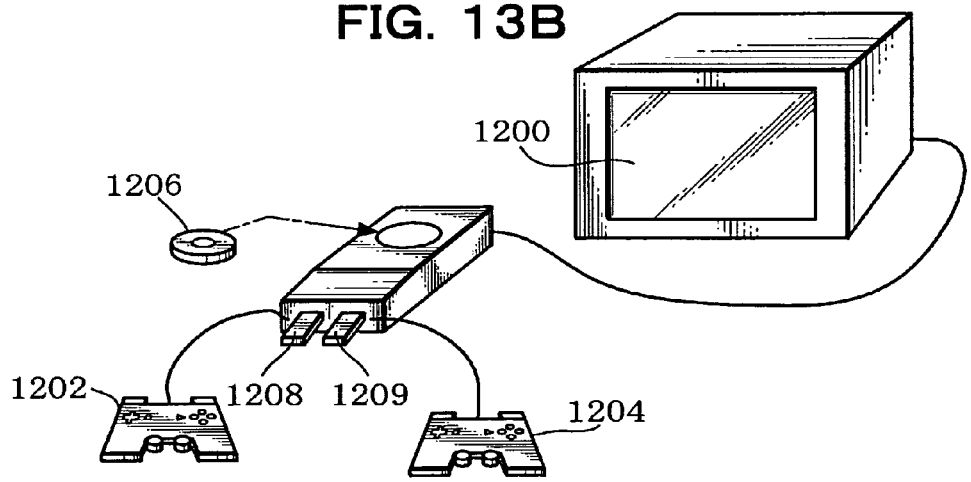

FIG. 13B shows a home game system (image generation system) to which this embodiment is applied. Players can enjoy a game through use of controllers 1202 and 1204 while viewing a game scene displayed on a display 1200. In such a case, the aforementioned stored program (stored information) has been stored in a CD 1206 which is a removable information storage medium in the present system or in memory cards 1208 and 1209.

Figure 13C:
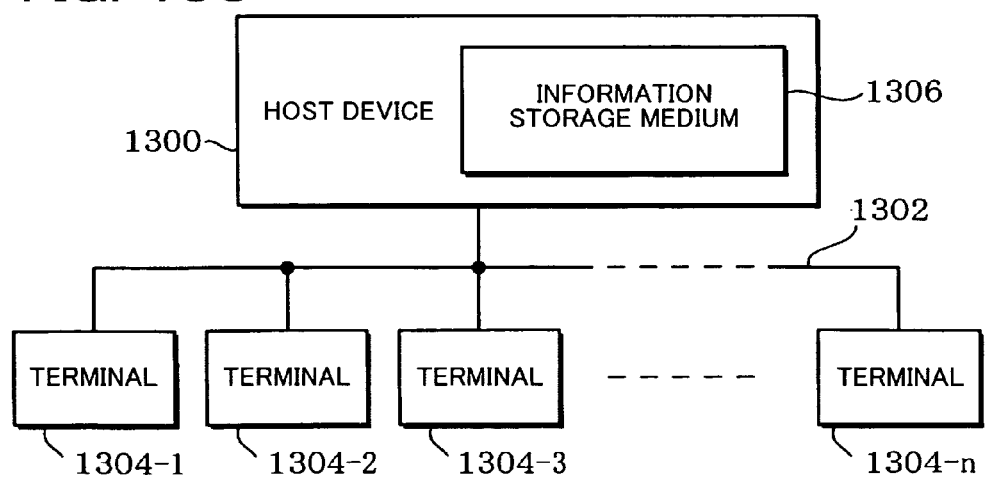

FIG. 13C shows an example when this embodiment is applied to a system which includes a host device 1300 and terminals 1304-1 to 1304-$n$ (in the form of game machines or portable telephones) which are interconnected through this host device 1300 and a network 1302 (e.g., a small-scale network such as LAN or a wide area network such as Internet). In such a case, the aforementioned stored program (stored information) may have been stored in an information storage medium 1306 such as a magnetic disk device, magnetic tape device, memory or the like which can be controlled by the host device 1300. If each of the terminals 1304-1 to 1304-$n$ can generate game images and sounds by standalone, the host device 1300 delivers a game programs or the like for generating the game images and sounds to the terminal 1304-1 to 1304-$n$. On the other hand, if the terminals 1304-1 to 1304-$n$ cannot generate the images and sounds by standalone, the host device 1300 generates them which are in turn transferred to the terminals 1304-1 to 1304-$n$.

In the configuration of FIG. 13C, each section of this embodiment may be realized by the host device (server) and terminals dispersedly. The aforementioned stored program (stored information) for realizing each section of this embodiment may have been stored in the information storage medium in the host device (server) and the information storage media of the respective terminals dispersedly.

Each of the terminals connecting to the network may be either in the form of a home game system or an arcade game system.

It is to be understood that the present invention is not limited to the aforementioned embodiment, but may be carried out in any one of various other forms.

For example, the terms referred to as the broad terms (consumption item, game termination condition, rate of change and the like) in a certain passage of the specification or drawing, for example, the terms such as fuel, physical strength, number of laps, time limit, operation time, consumption rate, rate of reduction and the like may be equivalently replaced by the broad terms in the other passage of the specification or drawing.

The technique of calculating the consumption item parameter, the technique of calculating the rate of change in the consumption item parameter, the technique of determining the game termination condition and other techniques are not limited to those described in connection with this embodiment, but may be equivalently realized in any one of various other forms.

The consumption item parameter and game termination condition are not also limited to those described in connection with this embodiment, but may be in any one of various other forms.

Part of requirements of a claim of the present invention could be omitted from a dependent claim which depends on that claim. Moreover, part of requirements of any independent claim of the present invention could be made to depend on any other independent claim.

Each or all the features of the invention concerning one independent claim may be dependent on another independent claim. Further, the present invention can be applied to any one of various kinds of games (e.g., a fighting game, a competition game, a shooting game, a robot combat game, a sports game, a role playing game and the like).

Furthermore, the present invention can also be applied to any one of various kinds of image generation systems (e.g., an arcade game system, a home game system, a large-scale attraction system in which a number of players can participate, a simulator, a multimedia terminal, a system board generating game images and the like).

What is claimed is:

1. An image generation system which generates an image comprising:
   a memory which stores a program and data for generating an image; and
   at least one processor which is connected to the memory and performs a processing for generating an image,
   wherein the processor comprises:
   a game processing section which performs a game processing based on operation data from a control section, and performs a processing to terminate a game when a predetermined game termination condition is satisfied;
   a parameter calculation section which calculates a parameter of a consumption item which is consumed as a game progresses at a predetermined rate of consumption based on the predetermined game termination condition; and
   an image generation section which generates a game image based on a result of the game processing,
   wherein the predetermined game termination condition is a condition that, when satisfied, terminates the game;
   wherein the predetermined game termination condition is at least one of a number of laps on a course corresponding to a maximum number of laps required by one game play, a time limit of a game corresponding to a time period measured from the start of the game to the termination of the game, or a setting of a game quota corresponding to a quota to be attained by a player in the game, and
   wherein the parameter calculation section increases the rate of change of the parameter of the consumption item, as the number of laps on the course is reduced, as the time limit of the game is shortened, or as the setting of the game quota is reduced.

2. The image generation system as defined in claim 1, wherein the processor includes an object control section which controls a movement or a motion of an object, and
   wherein, when a value of the parameter of the consumption item becomes equal to zero as a game progresses, the object control section disables or limits a movement or a motion of an object.

3. The image generation system as defined in claim 1,
   wherein the game processing section performs a processing for causing a player to set an initial value of the parameter of the consumption item, and
   wherein the parameter calculation section changes the parameter of the consumption item from the initial value which has been set by a player.

4. The image generation system as defined in claim 1,
wherein the game processing section performs a processing for causing a player to set the game termination condition, and
wherein the parameter calculation section changes the parameter of the consumption item with the rate of change specified based on the game termination condition which has been set by a player.

5. The image generation system as defined in claim 1,
wherein the parameter of the consumption item is a parameter relating to a fuel, a part, a life or the number of bullets in a weapon.

6. A computer-readable information storage medium storing a program for generating an image, the program causing a computer to function as:
a game processing section which performs a game processing based on operation data from a control section, and performs a processing to terminate a game when a predetermined game termination condition is satisfied;
a parameter calculation section which calculates a parameter of a consumption item which is consumed as a game progresses at a predetermined rate of consumption based on the predetermined game termination condition; and
an image generation section which generates a game image based on a result of the game processing,
wherein the predetermined game termination condition is a condition that, when satisfied, terminates the game;
wherein the predetermined game termination condition is at least one of a number of laps on a course corresponding to a maximum number of laps required by one game play, a time limit of a game corresponding to a time period measured from the start of the game to the termination of the game, or a setting of a game quota corresponding to a quota to be attained by a player in the game, and
wherein the parameter calculation section increases the rate of change of the parameter of the consumption item, as the number of laps on the course is reduced, as the time limit of the game is shortened, or as the setting of the game quota is reduced.

7. The computer-readable information storage medium as defined in claim 6, the program causing a computer to function as:
an object control section which controls a movement or a motion of an object, and
wherein, when a value of the parameter of the consumption item becomes equal to zero as a game progresses, the object control section disables or limits a movement or a motion of an object.

8. The computer-readable information storage medium as defined in claim 6, wherein the game processing section performs a processing for causing a player to set an initial value of the parameter of the consumption item, and
wherein the parameter calculation section changes the parameter of the consumption item from the initial value which has been set by a player.

9. The computer-readable information storage medium as defined in claim 6,
wherein the game processing section performs a processing for causing a player to set the game termination condition, and
wherein the parameter calculation section changes the parameter of the consumption item with the rate of change specified based on the game termination condition which has been set by a player.

10. The computer-readable information storage medium as defined in claim 6, wherein the parameter of the consumption item is a parameter relating to a fuel, a part, a life or the number of bullets in a weapon.

* * * * *